United States Patent
Tsubota

(10) Patent No.: US 7,330,783 B2
(45) Date of Patent: Feb. 12, 2008

(54) SYSTEM FOR MANAGING VEHICLE INSPECTIONS

(75) Inventor: Tomohiro Tsubota, Nagoya (JP)

(73) Assignee: Mitsubishi Motors Corporation, Tokyo (JP)

( * ) Notice: Subject to any disclaimer, the term of this patent is extended or adjusted under 35 U.S.C. 154(b) by 296 days.

(21) Appl. No.: 11/105,348

(22) Filed: Apr. 14, 2005

(65) Prior Publication Data
US 2005/0251303 A1 Nov. 10, 2005

(30) Foreign Application Priority Data
Apr. 15, 2004 (JP) ............... 2004-120107

(51) Int. Cl.
G06F 19/00 (2006.01)
(52) U.S. Cl. .......................... 701/33; 701/29
(58) Field of Classification Search .................. 701/29
See application file for complete search history.

(56) References Cited

U.S. PATENT DOCUMENTS 5,835,871 A * 11/1998 Smith et al. ................. 701/29

2002/0103620 A1 8/2002 Hayashi et al.
2002/0198618 A1* 12/2002 Madden et al. ............. 700/101

FOREIGN PATENT DOCUMENTS

DE 19959140 A1 6/2001
JP 2002-12177 A 1/2002

* cited by examiner

Primary Examiner—Gary Chin
(74) Attorney, Agent, or Firm—Birch, Stewart, Kolasch & Birch, LLP

(57) ABSTRACT

The server includes statistical processing section for sequentially statistically processing a ranking of causes of a defect on the basis of defect information on a vehicle transmitted by the inspection terminal. The repair terminal includes display section for displaying the defect information, instructing section provided in the display section to give an instruction on display of ranking of causes of the defect, and section for causing the ranking of the causes of the defect to be displayed on the display section when the instructing section is operated.

6 Claims, 4 Drawing Sheets

SYSTEM FOR MANAGING VEHICLE INSPECTIONS

CROSS-REFERENCE TO RELATED APPLICATIONS

This application is based upon and claims the benefit of priority from prior Japanese Patent Application No. 2004-120107, filed Apr. 15, 2004, the entire contents of which are incorporated herein by reference.

BACKGROUND OF THE INVENTION

1. Field of the Invention

The present invention relates to a system for managing vehicle inspections on a vehicle production line.

2. Description of the Related Art

Conventional automobile production lines are classified into the following two types. In a first type, a plurality of inspecting stages are set for a vehicle. In each inspecting stage, inspection data is downloaded from a host computer into a personal computer. An inspector carries out inspections on the basis of the inspection data. The inspector then inputs the results of the inspections to the personal computer to transmit them to the host computer. In a second type, at the beginning of the inspections, an inspection instruction sheet is created by printing reference data required for inspections in the respective stages, on a sheet in a bar code form. The inspection instruction sheets are then attached to the vehicle. In the first stage, the bar code is read to obtain the reference data. Inspections are then carried out on the basis of the reference data. A bar code label indicating the results is then created and applied to the inspection instruction sheet. Thus, the inspection instruction sheet is transferred to the next stage (see, for example, Jpn. Pat. Appln. KOKAI Publication No. 2002-12177).

If any defect is found as a result of the inspections based on the inspection instruction sheet, the contents of the defect are entered in a limited space in the inspection instruction card.

In the subsequent stage, the contents of the defect are checked to estimate the cause of the defect before repair.

The estimation of the cause of the defect during a repair stage depends on the worker's knowledge and experience. The probability of correctly estimating the cause of the defect also depends on the skill of the worker. Inability to identify the cause of the defect precludes prompt and accurate repair.

Moreover, even if the cause of the defect is successfully found, failure to determine a repair method early also prevents prompt and accurate repair.

BRIEF SUMMARY OF THE INVENTION

It is an object of the present invention to provide a system for managing vehicle inspections which enables the display of ranking of possible causes of a defect and which also enables the display of ranking of possible repair methods for the cause of the defect to support identification of the cause of the defect and the repair method for the cause.

According to one aspect of the invention, there is provided a system for managing vehicle inspections, the system comprising a server used on a vehicle production line and including an inspection master database which stores inspection items for parts to be repaired; an inspection terminal and repair terminal which communicate with the server via a LAN and which are used in a plurality of inspection stages; and a master managing terminal connected to the LAN to input inspection information, wherein the server comprises:

a statistical processing section configured to sequentially statistically process a cause of a defect on the basis of defect information on a vehicle transmitted by the inspection terminal, and the repair terminal comprises:

a display section configured to display the defect information;

an instructing section provided in the display section and configured to give an instruction on display of ranking of causes of the defect; and a display control section configured to cause the ranking of the causes of the defect to be displayed on the display section when the instructing section is operated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
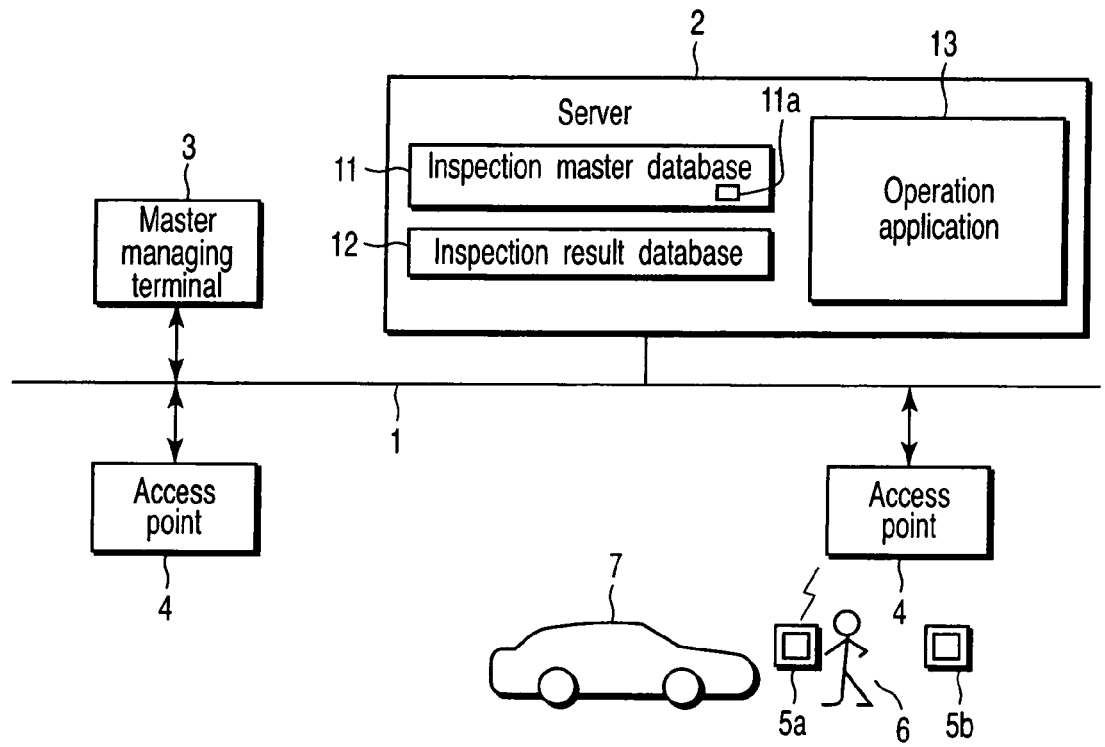
FIG. 1 is a diagram showing the configuration of an inspection managing system according to an embodiment of the present invention.

With reference to the drawings, description will be given of operations of an embodiment of the present invention. FIG. 1 is a diagram showing the configuration of a system for managing vehicle inspections. In the figure, reference numeral 1 denotes a LAN placed in a vehicle manufacturing plant. The LAN 1 connects to a server 2, a master managing terminal 3, and a plurality of access points 4. Each of the access points 4 communicates wirelessly with a portable inspection terminal 5a serving as an inspecting terminal, and a portable repair terminal 5b serving as a repairing terminal. These portable terminals are mobile terminals located close to the access point 4.

The portable inspection terminal 5a is carried by an inspector 6. Every time a predetermined process on a production line is finished, the portable inspection terminal 5a is operated to inspect a plurality of sites or parts to be inspected which were integrated into an automobile 7 during the process.

The portable repair terminal 5b is carried by a repairer to repair a defect found during the inspection stage, in a subsequent repair checking stage, the inspection stage using the portable inspection terminal 5a.

The server 2 is provided with an inspection master database 11, an inspection result database 12, and an operation application 13.

The inspection master database 11 is provided with a library 11a that stores inspection jobs and repair methods for defects and their causes. Here, the inspection job means the correspondence between an inspection item and a site to be inspected. The inspection item means the correspondence between an inspection target and contents of inspections.

The inspection result database 12 stores defect information transmitted by the portable inspection terminal 5a and repair performance information transmitted by the portable repair terminal 5b.

Figure 2:
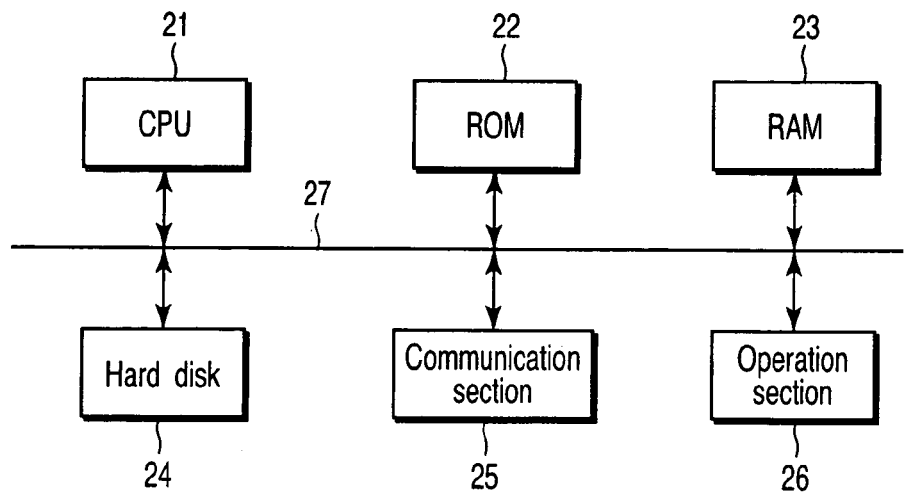
FIG. 2 is a block diagram showing the hardware configuration of a server according to the embodiment.

As shown in FIG. 2, the server 2 is provided with a central processing unit (CPU) 21 constituting a control section main body, a read only memory (ROM) 22 that stores program data used by the CPU 21 to control each section, a random access memory (RAM) 23 provided with a memory temporarily used by the CPU 21 to execute data transmission, reception, processing, or the like, a communication section 25 which transmits and receives data to and from the master managing terminal 3 via the LAN 1 and which transmits and receives data to and from the portable inspection terminal 5 via the access point 4, and an operation section 26 used for key inputs, display of indicators, and the like. The components of the server 2 are electrically connected together by a bus line 27.

Figure 3:
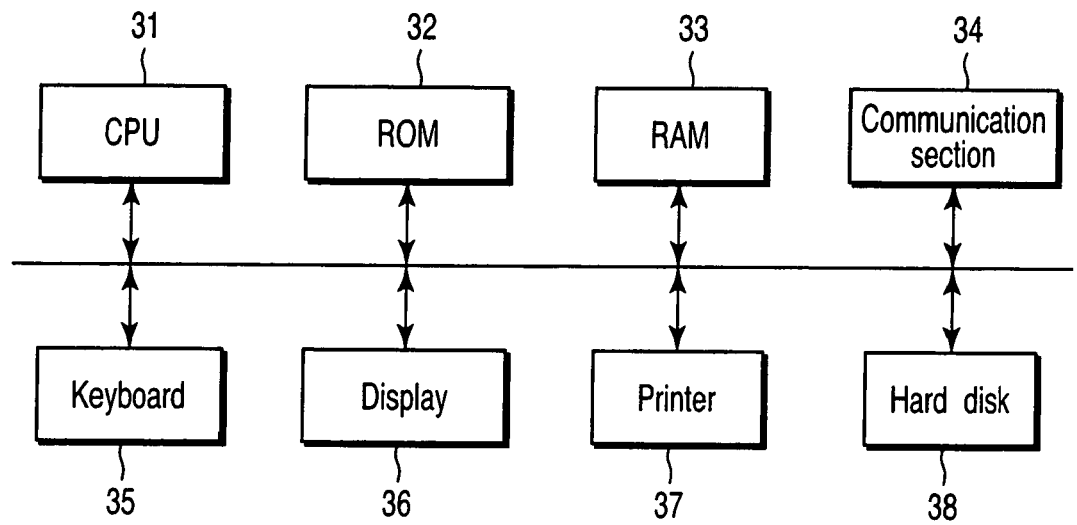
FIG. 3 is a block diagram showing the hardware configuration of a master managing terminal according to the embodiment.

The master managing terminal 3 is operated by the manager of the production line. As shown in FIG. 3, the master managing terminal 3 is provided with a CPU 31 constituting a control section main body, a ROM 32 that stores program data used by the CPU 31 to control each section, a RAM 33 provided with a memory temporarily used by the CPU 31 to execute data transmission, reception, processing, or the like and a memory storing a small amount of data, a communication section 34 which transmits and receives data to and from the server 2 via the LAN 1, a keyboard 35 provided with various keys to perform operations, a display 36 composed of a liquid crystal or the like and used for data display or the like, a printer 37 used to print required data, and a hard disk device 38 used to store a large amount of data. The components of the server 2 are electrically connected together by a bus line 39.

Figure 4:
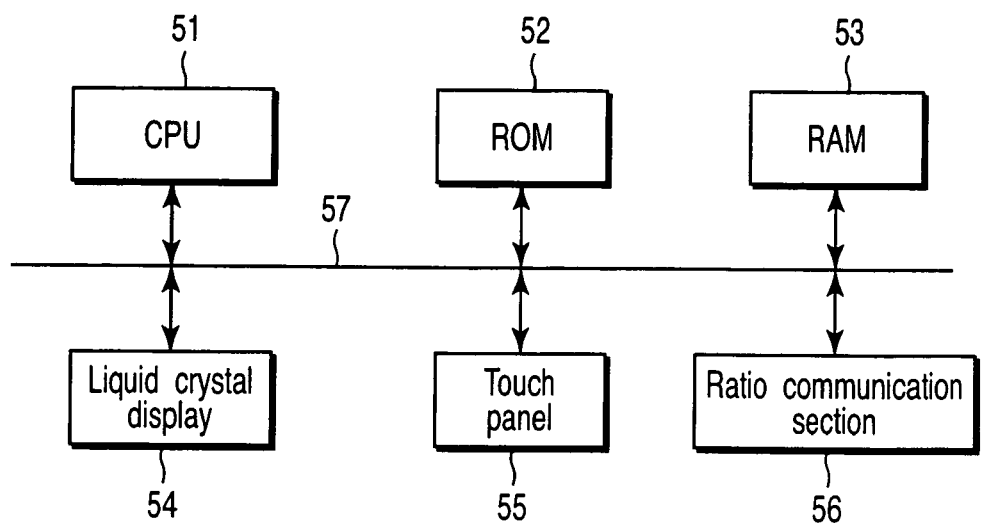
FIG. 4 is a diagram showing the hardware configuration of a portable inspection terminal and a portable repair terminal.

As shown in FIG. 4, each of the portable terminals 5a and 5b is provided with a CPU 51 constituting a control section main body, a ROM 52 that stores program data used by the CPU 51 to control each section, a RAM 53 provided with a memory temporarily used by the CPU 51 to execute data transmission, reception, processing, or the like and a memory storing a small amount of data, a liquid crystal display 54 used for data display, display of various types of information on the input screen, or the like, a touch panel 55 placed on the liquid crystal display 54 to input information to an input screen displayed on the liquid crystal display 54, and a radio communication section 56 that transmits and receives data to and from the access point 4 by radio. The components of the portable terminal 5a to 5c are electrically connected together by a bus line 57. The portable repair terminal 5b stores a program that executes the process shown in the flowchart in FIG. 6.

Now, description will be given of operations of an embodiment of the present invention configured as described above. First, using the master managing terminal 3, the manager inputs, for each automobile to be manufactured, inspection information as to what inspections to be carried out and which sites or parts to be inspected in each stage. As a result, the inspection information is transmitted to the inspection master database 11 of the server 2 as an inspection job.

The portable inspection terminal 5a then displays an inspection screen on the liquid crystal display 54 on the basis of the inspection job transmitted by the server 2. Then, the results of inspections in each step are input to the inspection screen.

The inspector inspects sites to be inspected which are displayed on the inspection screen. If any defect is eliminated as a result of the inspections, defect information (inspection target, inspection contents, inspection site, and defect) and the cause of the defect are transmitted to the server 2 and stored in the inspection result database 12.

Figure 5:
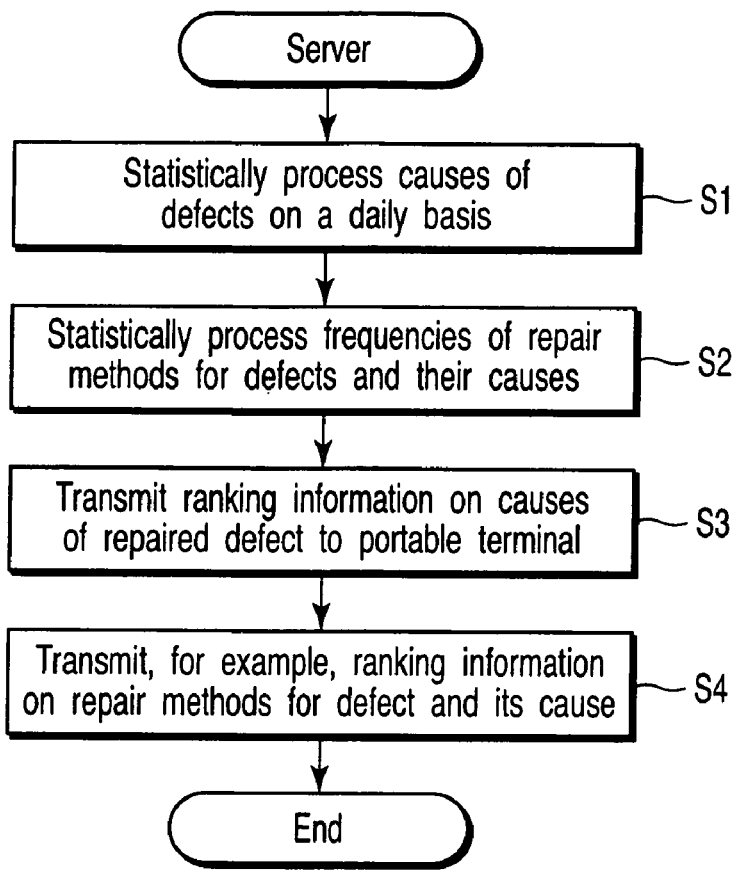
FIG. 5 is a flowchart illustrating operations of a server according to the embodiment.

The server 2 executes a process shown in the flowchart in FIG. 5. Specifically, the server 2 statistically processes ranking information on the causes of defects contained in defect information, on a daily basis (step S1) (first statistical processing means). Here, the defect information has four parameters, the inspection target, the inspection contents, the inspection site, and the defect.

Moreover, the server 2 statistically processes ranking information on repairing methods for a defect and its cause on a daily basis (step S2) (second statistical processing means). The results of the statistical process are stored in the library 11a of the inspecting master database 11. Then, statistics are stored compiled on repair methods on the basis of the repair method contained in the results of repairs transmitted by the portable repair terminal 5b. Since the defect information has the four parameters as previously described, if any of the parameters for the defect is different from that of the other defects, that defect is considered to differ statistically from the others even though it has the same cause and requires the same repair method as the other defects. Each repair method has its own ID, and the same repair method ID is applied to defects for which the four parameters of the defect information are the same and which have the same cause.

Figure 7:
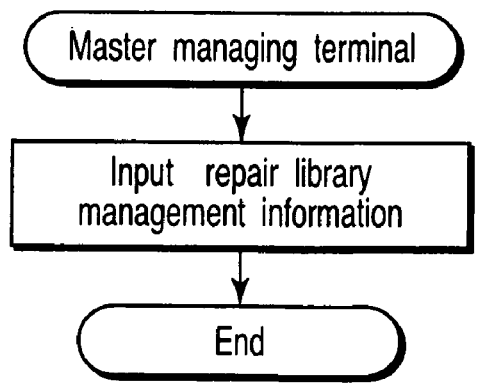
FIG. 7 is a flowchart illustrating a process executed by the master managing terminal according to the embodiment.

Further, the master managing terminal 3 executes the process shown in the flowchart in FIG. 7, under the control of the manager, to register, in the library 11a, ranking information on repair methods for the defect and its cause which has been processed by the second statistical processing means. That is, the manager maintains the reliability of the ranking information on repair methods for defects and their causes registered in the library 11a by modifying or deleting the ranking information as required.

Then, the ranking information on the causes of the defect processed in step S1 is transmitted to the portable repair terminal 5b (step S3).

Moreover, the ranking information on the repair methods for the defect and its cause processed in step S2 is transmitted to the portable repair terminal 5b.

Figure 6:
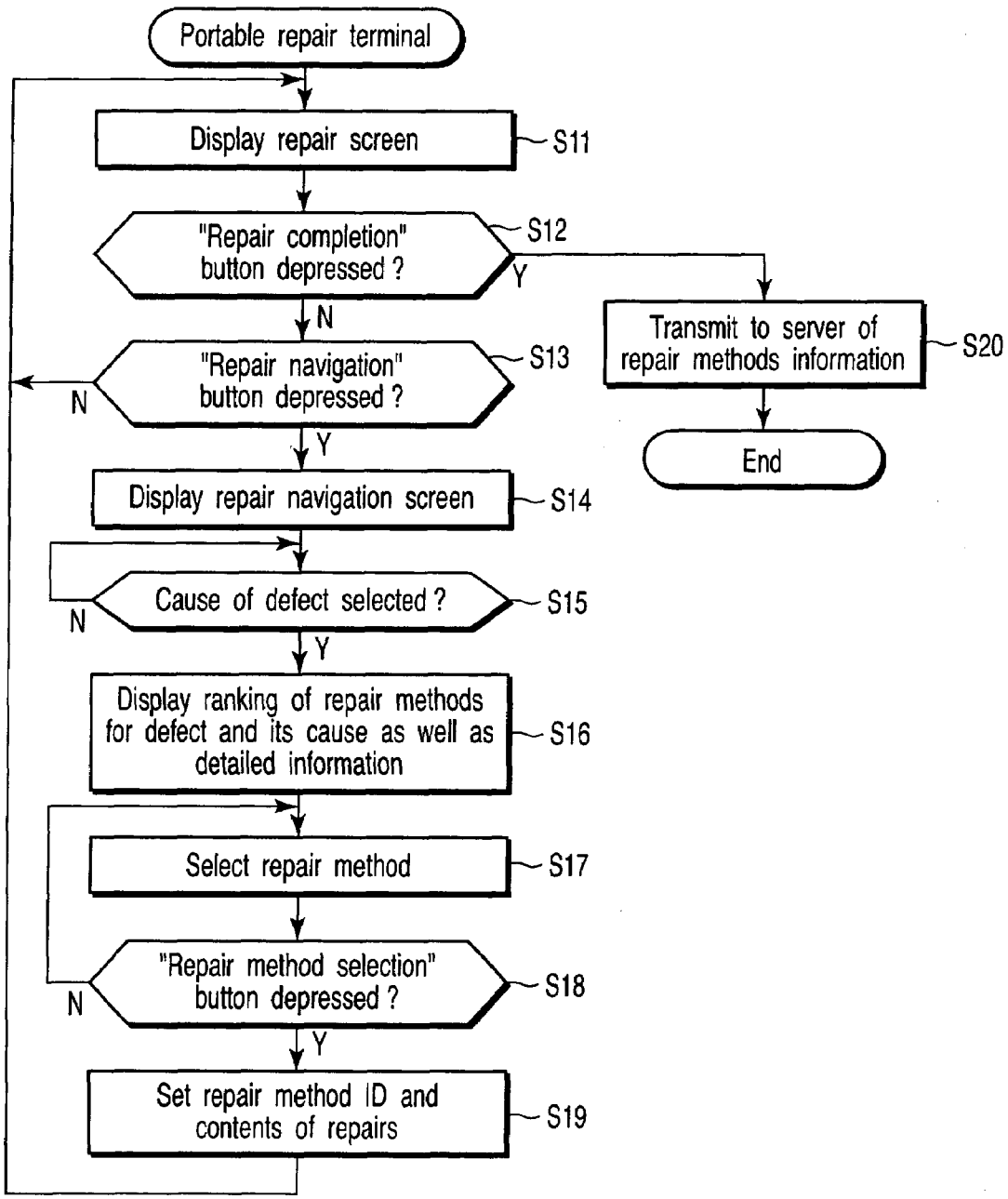
FIG. 6 is a flowchart illustrating a process executed by the portable repair terminal according to the embodiment.

Then, the portable repair terminal 5b executes a process shown in the flowchart in FIG. 6. First, a repair screen is displayed on the liquid crystal display 54 of the portable repair terminal 5b (step S11).

The repair screen displays process and worker information, vehicle information, defect information, and repair contents.

A "repair completion" button is displayed at the upper right of the defect information; the "repair completion" button is operated by a repairer when a repair operation is finished.

The "repair contents" section shows a column in which the cause of the defect is displayed, a column in which an ID indicative of the repair method is displayed, and a column in which the procedure of the repair method is specifically displayed.

Further, to the right of the column in which the ID indicative of the repair method is displayed, a repair navigation button is displayed which is operated to display the ranking information on the causes of the defect processed by the first statistical processing means, previously described.

Then, the portable terminal determines whether or not the repair completion button has been depressed (step S12). Since the repair has not been completed and thus the repair completion button has not been depressed, the process advances to step S13. In step S13, the portable terminal determines whether or not the repair navigation button 70 has been depressed.

If the repairer desires to acquire ranking information on the causes of the defect, he or she depresses the repair navigation button.

Thus, in step S13, the result of the determination is "YES", and a repair navigation screen is displayed on the liquid crystal display 54 of the portable repair terminal 5b (step S14).

The repair navigation screen displays target defect information, defect cause ranking information, a repair library, and the repair contents.

That is, depressing the repair navigation button causes the ranking information on the causes of the defect processed by the first statistical processing means to be displayed on the repair navigation screen.

The displayed ranking information on the causes of the defect includes, for example, "causes unknown (probability: 25%)", which is displayed first, and "inappropriate mounting (probability: 25%)", which is displayed second.

The repairer selects a cause with a higher probability from the ranking information on the causes of the defect.

To select a cause of the defect, the repairer touches the cause included in the ranking information on the causes of the defect. Description will be given of operations performed if for example, "inappropriate mounting", included in the ranking information on the causes of the defect, is touched.

First, the portable terminal determines whether or not a cause of the defect has been selected (step S15). If the result of the determination in step S15 is "YES", the display switches to a repair display screen.

That is, the repair display screen displays the selected "inappropriate mounting" in the column for the cause of the target defect, which has been empty. Once the cause of the defect has been identified, the statistically processed ranking information on the repair methods for the defect and its cause is called and displayed in the library 11a (step S16). The repairer depresses a repair method selection button in order to select a repair method from the repair ranking.

Then, the repairer touches the screen to select one of the repair methods displayed in the repair ranking (step S17).

The portable terminal then determines whether or not the repair method selection button has been depressed (step S18).

If the result of the determination in step S18 is "YES", the display returns to the repair screen. The ID of the repair method is displayed in the column of the repair screen in which the ID of the repair method is displayed, the column having been empty. Further, the contents of repairs carried out in accordance with the repair method ID is displayed in the column in which the procedure of the repair method is displayed. That is, the ID of the repair method and the contents of repairs are set (step S19).

The repairer carries out repairs in accordance with the procedure displayed in the "repair contents" section.

If the repairs have been completed, the repairer depresses the repair completion button. When the repair completion button is thus depressed, the result of the determination in step S12 is "YES". The portable repair terminal 5b transmits information on the repair method to the server 2 (step S20).

This information causes the contents of the library 11a to be updated.

As described above, the ranking of the causes of the defect is displayed on the portable repair terminal. Consequently, the operator can quickly and efficiently identify the cause of the defect. Moreover, the portable repair terminal displays the ranking of repair methods for the defect and its cause. Consequently, the operator can quickly and efficiently identify the repair method.

In the above embodiment, the first and second statistical processing means execute processes on a daily basis. However, the present invention is not limited to this.

In the description of the present embodiment, the portable inspection terminal is used as an inspection terminal. Further, the system communicates with the server 2 via the access point 4 on the basis of the radio communication system. However, the present invention is not limited to this. It is possible to use an installed inspection terminal set by the server 2 and LAN.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for managing vehicle inspections, the system comprising a server used on a vehicle production line and including an inspection master database which stores inspection items for parts to be inspected and an inspection result database storing inspected defects and causes as well as repair methods; an inspection terminal and repair terminal which communicate with the server via a LAN and which are used at each of a plurality of inspection stages; and a master managing terminal connected to the LAN to input inspection information, wherein a predetermined inspection items are sent from the server and displayed on the inspection terminal so that an inspector can inspect a part of the vehicle to find out a defect and cause thereof on the basis of the inspection items, wherein the defect information denoting a result of the inspection including the defect and cause is sent to the server via the inspection terminal, and wherein a repairer can perform a repair method based on the defect and cause sent from the server and displayed on the repair terminal for eliminating the defect, wherein the server comprises:

a statistical processing section configured to sequentially statistically process defects and causes to form the ranking of the defects and causes according to the defects and causes on the basis of defect information and the cause information transmitted from the inspection terminal, and the repair terminal comprises:

a display section configured to display the defect and cause information from the inspection result database;

an instructing section provided in the display section and configured to give an instruction on display of ranking of defects and causes based on frequencies of the causes and the repair methods;

means for transmitting repair method information performed by the repairer based on the defect and cause displayed on the display section to the inspection result database for the statistical processing; and a display control section configured to cause the ranking of the defects, causes, and the repair methods to be displayed on the display section when the instructing section is operated to repair the defect.

2. The system for managing vehicle inspections according to claim 1, wherein the server further comprises:

second statistical processing section for sequentially statistically processing repair methods for defects and causes thereof based on the defect information sent from the inspection terminal, and the repair terminal further comprises:

a selecting section configured to select one of the causes displayed in the ranking of the defects; and the display control section configured to cause display of ranking of repair methods for the defects statistically processed by the second statistical processing section and the cause of the defect selected by the selecting section.

3. The system for managing vehicle inspections according to claim 2, further comprising:

the selecting section configured to select one of the repair methods displayed in the ranking of the repair methods; and the display control section configured to indicate the procedure of the repair method selected by the selecting section to be displayed on a repair screen.

4. A method for managing vehicle inspections which is used for a system for managing vehicle inspections, the system comprising a server used on a vehicle production line and including an inspection master database which stores inspection items for parts to be inspected; an inspection terminal and repair terminal which communicate with the server via a LAN and which are used in a plurality of inspection stages; and a master managing terminal connected to the LAN to input inspection information, wherein a predetermined inspection items are sent from the server and displayed on the inspection terminal so that an inspector can inspect a part of the vehicle to find out a defect and a cause thereof on the basis of the inspection items, wherein the defect information denoting a result of the inspection including the defect and cause is sent to the server via the inspection terminal, and wherein a repairer can perform a repair method based on the defect and cause sent from the server and displayed on the repair terminal for eliminating the defect, wherein the method comprises:

sequentially statistically processing defects and causes to form a ranking of the defects and causes on the basis of defect and cause information on a vehicle transmitted by the inspection terminal;

displaying the defect and cause information to perform a repair method by a repairer;

giving an instruction on display of the ranking of the defects, causes and repair method based on frequencies of the defects, causes, and repair methods; and causing the ranking of the defects, causes, and repair methods to be displayed on the display section when the instructing section is operated.

5. The method for managing vehicle inspections according to claim 4, further comprising:

sequentially statistically processing defects and causes based on the defect information sent from the inspection terminal;

selecting one of the causes displayed in the ranking of the defects and causes; and causing display of ranking of repair methods for the defects and causes statistically processed.

6. The method for managing vehicle inspections according to claim 5, further comprising:

selecting, at the repair terminal, one of the repair methods displayed in the ranking of the repair methods; and indicating, on a repair screen of the repair terminal, a procedure of the selected repair method.

* * * * *